United States Patent
Mitra et al.

(10) Patent No.: US 11,093,153 B1
(45) Date of Patent: Aug. 17, 2021

(54) INTER-DRIVE DATA TRANSFER

(71) Applicant: Seagate Technology LLC, Fremont, CA (US)

(72) Inventors: Sumanranjan Mitra, Mumbai (IN); Lalitha Kameswar Mallela, Telangana (IN)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/882,683

(22) Filed: May 25, 2020

Related U.S. Application Data

(62) Division of application No. 15/898,849, filed on Feb. 19, 2018, now Pat. No. 10,664,184.

(60) Provisional application No. 62/553,835, filed on Sep. 2, 2017.

(51) Int. Cl.
  *G06F 3/06* (2006.01)
  *G06F 13/42* (2006.01)

(52) U.S. Cl.
  CPC ........ *G06F 3/0646* (2013.01); *G06F 13/4282* (2013.01); *G06F 2213/0026* (2013.01)

(58) Field of Classification Search
  CPC ...................................................... G06F 3/0646
  See application file for complete search history.

(56) References Cited

U.S. PATENT DOCUMENTS

| | | |
|---|---|---|
| 5,913,028 A | 6/1999 | Wang et al. |
| 10,268,693 B1 * | 4/2019 | Nanda ................ G06F 16/119 |
| 2006/0053261 A1 * | 3/2006 | Prahlad ............... G06F 3/0685 711/162 |
| 2014/0351538 A1 * | 11/2014 | Kono .................... G06F 3/0647 711/162 |
| 2015/0261709 A1 * | 9/2015 | Billi ..................... G06F 13/404 710/316 |
| 2018/0095838 A1 * | 4/2018 | Kono .................... G06F 3/0617 |
| 2018/0225177 A1 * | 8/2018 | Bhagi ................... G06F 16/21 |

* cited by examiner

*Primary Examiner* — Sean D Rossiter
(74) *Attorney, Agent, or Firm* — Kirk A. Cesari

(57) ABSTRACT

A drive-to-drive data transfer may be performed by means of a host configuring registers in a source device and a sink device and triggering a transfer. Data copy logic of controllers of the source and sink devices may then proceed to perform the endpoint to endpoint transfer, for example, using transaction layer packets (TLPs).

20 Claims, 9 Drawing Sheets

INTER-DRIVE DATA TRANSFER

CROSS-REFERENCE TO RELATED APPLICATION

This application is a divisional of and claims priority to U.S. patent application Ser. No. 15/898,849, filed Feb. 19, 2018, now U.S. Pat. No. 10,664,184, to be issued May 26, 2020 which is a non-provisional of and claims priority to U.S. Provisional Patent Application No. 62/553,835 filed on Sep. 2, 2017, all of which are incorporated herein by reference in its entirety.

SUMMARY

In some embodiments, a host device may include a host memory and a host processor. The host processor may be configured to receive a request to transfer data from a first data storage device to a second data storage device, generate source configuration data configured to cause the first storage device to perform the requested data transfer as an endpoint to endpoint data transfer without copying the data of the requested data transfer into the host memory, and write the generated source configuration data to a memory of the first data storage device to cause the first data storage device to perform the requested data transfer.

In some embodiments, a data storage device may include a data storage medium, one or more feature registers exposed to a host device of the data storage device, and a controller. The controller may be configured to determine that source configuration data has been written to the one or more feature registers, the source configuration data configured to cause the data storage device to perform an endpoint to endpoint data transfer of identified data to a sink data storage device without copying the identified data into a host memory of the host device. The controller may retrieve the identified data from the data storage medium based on the source configuration data and perform the endpoint to endpoint data transfer of the identified data to the sink data storage device without copying the identified data into the host memory.

In some embodiments, a data storage device may include a data storage medium, one or more feature registers exposed to a host device of the data storage device and a source data storage device, and a controller. The controller may be configured to determine that sink configuration data has been written to the one or more feature registers, the sink configuration data configured to cause the data storage device to receive an endpoint to endpoint data transfer of received data from the source data storage device without the received data being copied into a host memory of the host device, receive the endpoint to endpoint data transfer of the received data from the source data storage device at the one or more feature registers, and store the received data from the feature registers to the data storage medium based on the sink configuration data.

DETAILED DESCRIPTION

Figure 1:
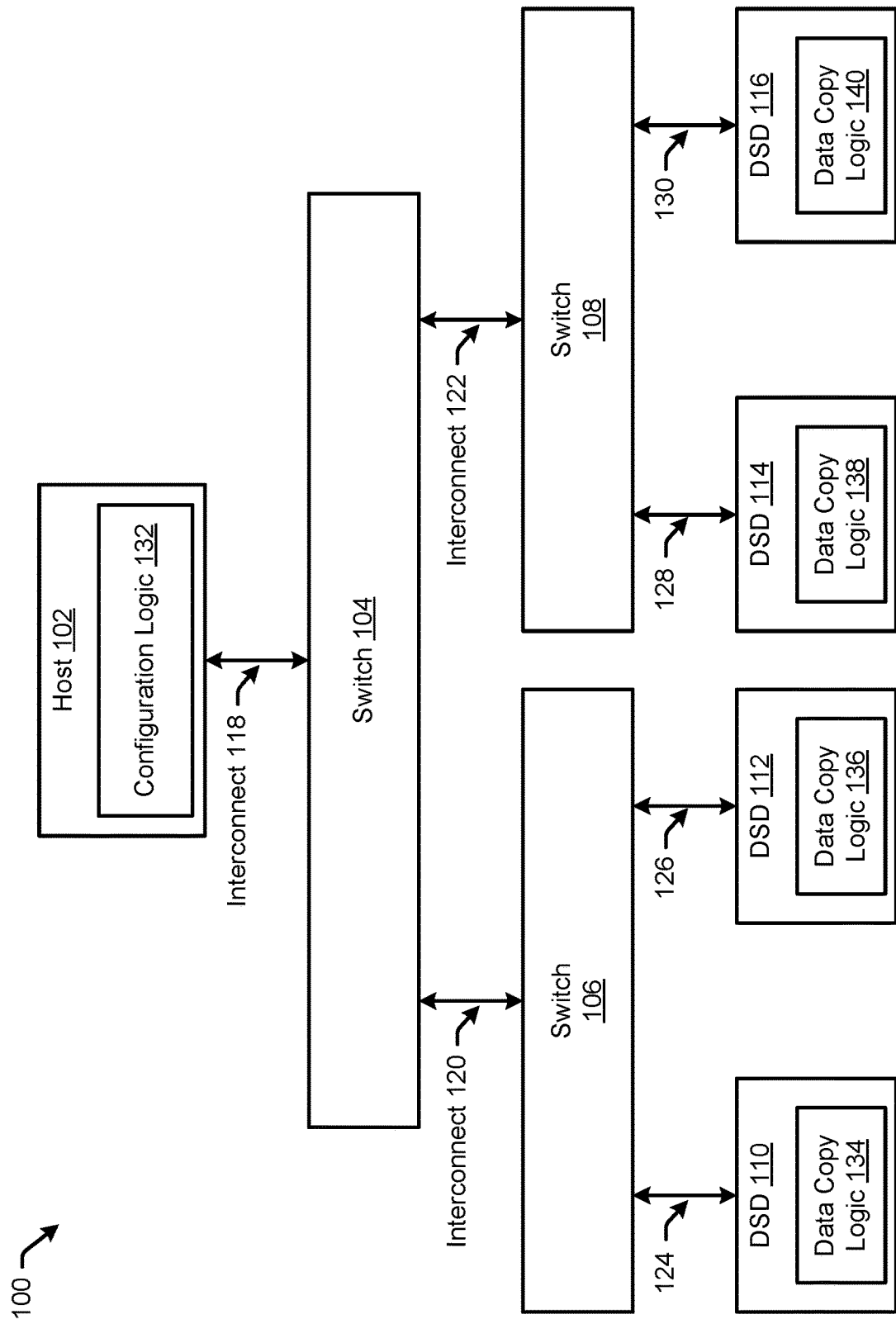
FIG. 1 is a block diagram of a system including inter-drive transfers, in accordance with certain embodiments of the present disclosure.

In the following detailed description of the embodiments, reference is made to the accompanying drawings which form a part hereof, and in which are shown by way of illustrations. The features of the various embodiments and examples described herein may be combined, exchanged, removed, other embodiments utilized, and structural changes made without departing from the scope of the present disclosure.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

In accordance with various embodiments, dedicated hardware implementations including, but not limited to, application specific integrated circuits, programmable logic arrays, and other hardware devices can be constructed to implement the methods and functions described herein. Further, the methods and functions described herein may be implemented as a device, such as a memory device, including instructions that when executed cause a processor to perform the methods.

The present disclosure generally relates to data transfer, and in some embodiments, the present disclosure relates to data transfer between storage devices without active participation from a host device. Some data processing systems performing data transfers may include host computers, data storage devices, servers, processors, controllers, and so on.

In some systems, data may be transferred between two drives by first copying data from a source drive into a temporary memory buffer on the host and from the temporary memory buffer into the sink drive. Such active participation by the host may lead to overheads such as host compute power and memory usage for multiple copying operations, increased traffic through storage area network (SAN) interconnects, increased time taken for copying data, etc.

As mentioned above, the present disclosure relates to data transfer between storage devices without active participation from a host device. Instead of a host device reading data from a source device and writing the data to a sink device, the drive-to-drive data transfer may be performed by means of the host configuring registers in the source and sink devices and triggering a transfer. Data copy logic of controllers of the source and sink devices may then proceed to perform the transfer, for example using transaction layer packets (TLPs) which may be sent using addresses configured by the host device.

Some examples herein may be implemented using the Peripheral Component Interconnect Express (PCIe) protocol and PCIe devices. PCIe is a packet switched network. In general, a PCI Express network or fabric may include three types of devices: the root complex, switches, and endpoints. The root complex is generally associated with or part of a host processor or controller of the PCIe network. The root complex (which may be used interchangeably herein with the host processor or controller) may be responsible for configuring the PCIe network at power-up. Since PCIe connections are point to point, switches may be used to expand the network. PCIe endpoints may be devices other than the host or root complex and switches. For example, endpoints may be I/O devices in the network (e.g. the sources of, and destinations for the data). In some implementation herein, the PCIe endpoints may include data storage devices.

PCIe networks may route data based on memory address or IDs, depending on the transaction type. As such, each device may be uniquely identified within the PCI Express network. This may require a process called enumeration.

Within a PCIe network (or tree), all devices may share the same address space. During initialization of the PCIe network, the root complex of the host may perform the enumeration process to determine the various buses that exist and the devices that reside on each bus, as well as the address space. The root complex may allocate bus numbers to the PCIe buses and configures the bus numbers to be used by the PCIe switches. The root complex may also set up the Base Address Registers (BAR) of each device.

The PCIe protocol includes Transaction Layer Packets (TLPs) which may be sent from host to endpoints, endpoints to host and endpoints to endpoints. Implementations according to this disclosure using PCIe protocol may utilize endpoint to endpoint TLPs to implement drive-to-drive data transfer which may facilitate, for example, large sized data copying between PCIe based drives (e.g. NVMe drives) without the need for data to be copied into host memory. Once configured by a host device, the source device may transfer data to a sink device without need for active intervention from the host device (e.g. commands (read, write, etc.) may not be need to be sent from the host device to move data from the source device to the sink device).

Once a host performs the configuration, such inter-device data transfers may be used to perform any scale of data copying, from individual data blocks to the cloning of drives. In some examples, the transfer may be configured to be ongoing such that the source device may continuously back up blocks to the sink device whenever any LBA of source device is updated by the host device.

Although the examples herein may be illustrated and described in the context of the PCIe protocol and devices, this is merely for ease of discussion. Further, embodiments of the disclosed subject matter are not limited to this context. For example, the techniques and systems disclosed may be used with any protocol which includes endpoint to endpoint transactions similar to or which provide similar functionality to those of the PCIe protocol.

Referring to FIG. 1, a block diagram of a system including inter-device transfers is shown and is generally designated 100. The system 100 provides a context for the examples shown in FIGS. 2-8.

The components of system 100 may include a host device and one or more devices connect to the host. In some embodiments, these devices may communicate using Peripheral Component Interconnect Express (PCIe) standard or a similar protocol. More particularly, the system 100 includes a host 102, switches 104-108 and data storage devices (DSDs) 110-116. The host 102 may be coupled to the switch 104 by an interconnect 118. Switch 104 may be coupled to switches 106 and 108 by interconnects 120 and 122, respectively. Switch 106 may be coupled to DSDs 110 and 112 by interconnects 124 and 126, respectively. Switch 108 may be coupled to DSDs 114 and 116 by interconnects 128 and 130, respectively.

The host device 102 may be any type of host such as a processor of an individual computer, a storage array controller in a data center or so on. The DSDs 110-116 may be any type of data storage device connected to the host (e.g. via a PCIe network). In some examples, the DSDs may be NVM Express (NVMe) devices. The switches 104-108 may be any type of root complex, PCIe switch or similar device. The interconnects 118-130 may be PCIe links, other connections or fabric. A PCIe link may refer to a point-to-point communication channel between two PCI Express ports. At the physical level, a link is composed of one or more lanes. Together, the switches 104-108 and interconnects 118-130 may comprise a PCIe switch fabric or network.

As shown in FIG. 1, the host device 102 may include configuration logic 132 and the DSDs 110-116 may include data copy logic 134-140. The configuration logic 132 and data copy logic 134-140 may be implemented as hardware, software, firmware of the respective devices or some combination thereof. For example, the configuration logic 132 may be software or drivers executed by one or more processors or controllers of the host 102 and the data copy logic 134-140 may be software or firmware instructions executed by processors or controllers of the DSDs. More details of the configuration logic 132 and data copy logic 134-140 are provided below with regard to FIGS. 2-8.

In general, the systems and techniques disclosed herein handle inter-device transfers in two phases. In a first phase, the configuration logic 132 of the host device 102 may configure the source and sink DSDs. In a second phase, the data copy logic of the configured DSDs may perform the configured transfer without active intervention by the host device.

Figure 2:
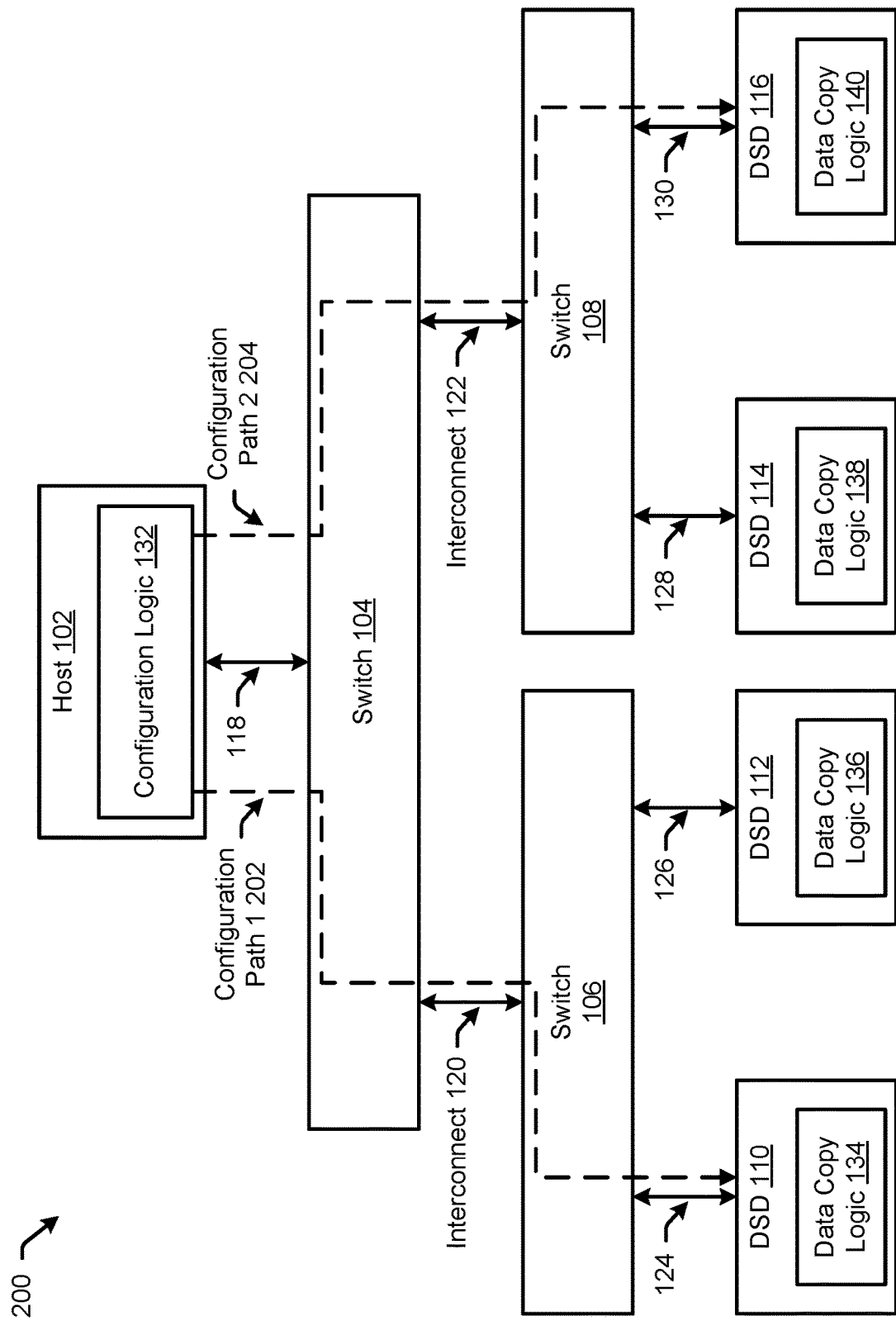
FIG. 2 is an illustration of an example configuration phase of the system of FIG. 1, in accordance with certain embodiments of the present disclosure.

FIG. 2 provides an illustration of an example configuration phase 200 of the system 100. In the example configuration phase 200 illustrated in FIG. 2, the configuration logic 132 may configure the DSD 110 as a source device of an inter-device data transfer via configuration path 202 which may include interconnect 118, switch 104, interconnect 120, switch 106, and interconnect 124. In addition, the configuration logic 132 may configure the DSD 116 as a sink device of the inter-device data transfer via configuration path 204 which may include interconnect 118, switch 104, interconnect 122, switch 108, and interconnect 130.

Figure 3:
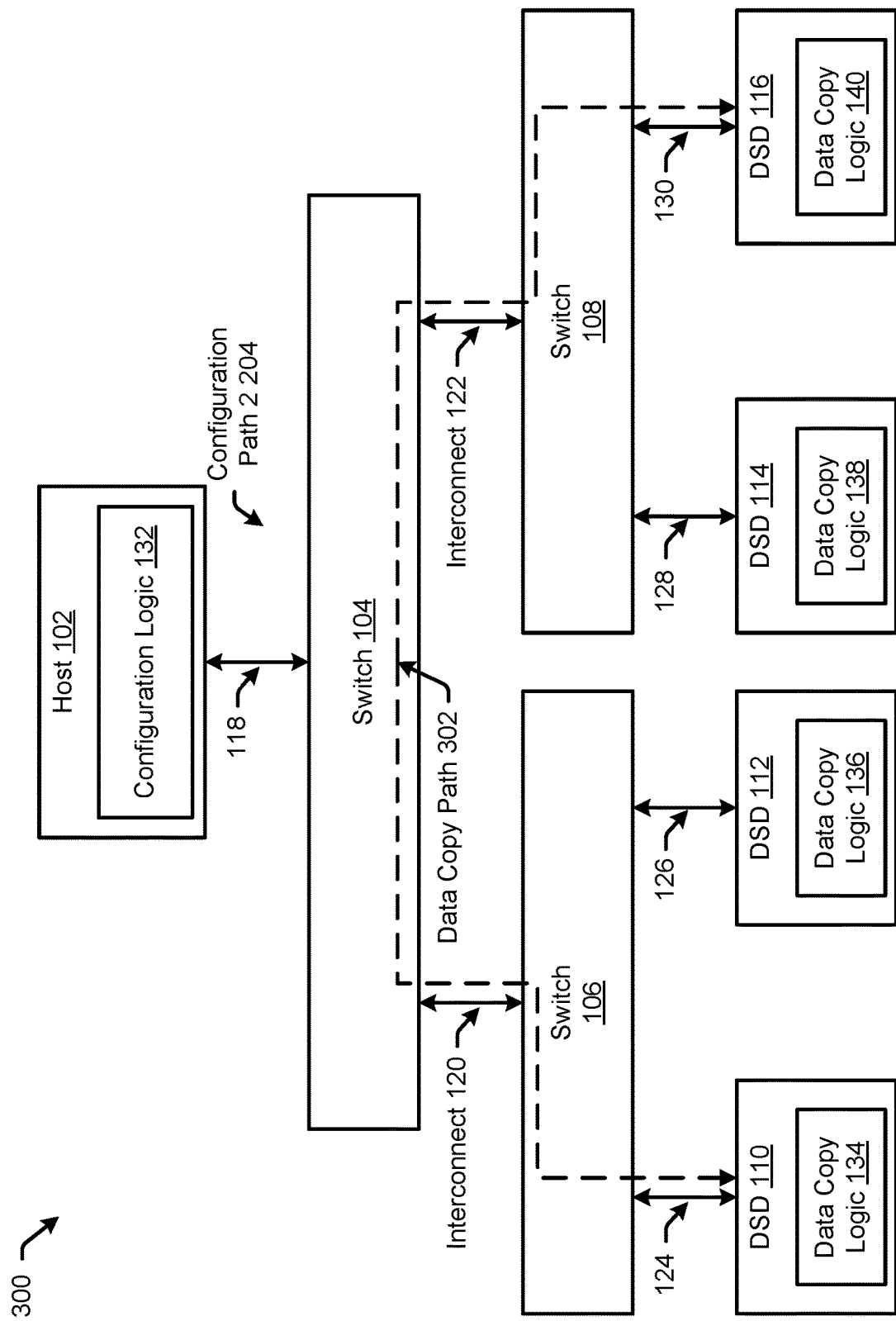
FIG. 3 is an illustration of an example data copy phase of the system of FIG. 1, in accordance with certain embodiments of the present disclosure.

FIG. 3 provides an illustration of an example data copy phase 300 of the system 100. In the example data copy phase 300 illustrated in FIG. 3, based on the configuration performed by the configuration logic 132 in FIG. 2, the data copy logic 134 may copy data from a data storage medium of the DSD 110 and transfer the data to the DSD 116 via the data copy path 302 (e.g. interconnect 124, switch 106, interconnect 120, switch 104, interconnect 122, switch 108, and interconnect 130). Also based on the configuration performed by the configuration logic in FIG. 2, the data copy logic 140 of the DSD 116 may act to receive and store data transferred by the DSD 110.

In some examples, drive to drive data transfers may reduce the distance data needs to travel in a PCIe topology which may lead to savings in power, increased speed of transfer and reduced memory requirements for the host system. This may avoid host memory becoming a bottleneck, for example, when multiple streams of data need to be transferred in parallel by the topology. An example of such a shortened distance may be given for a travel between DSD 110 and 112 where the data does not need to travel to switch 104 when transferred in accordance with this disclosure.

Figure 4:
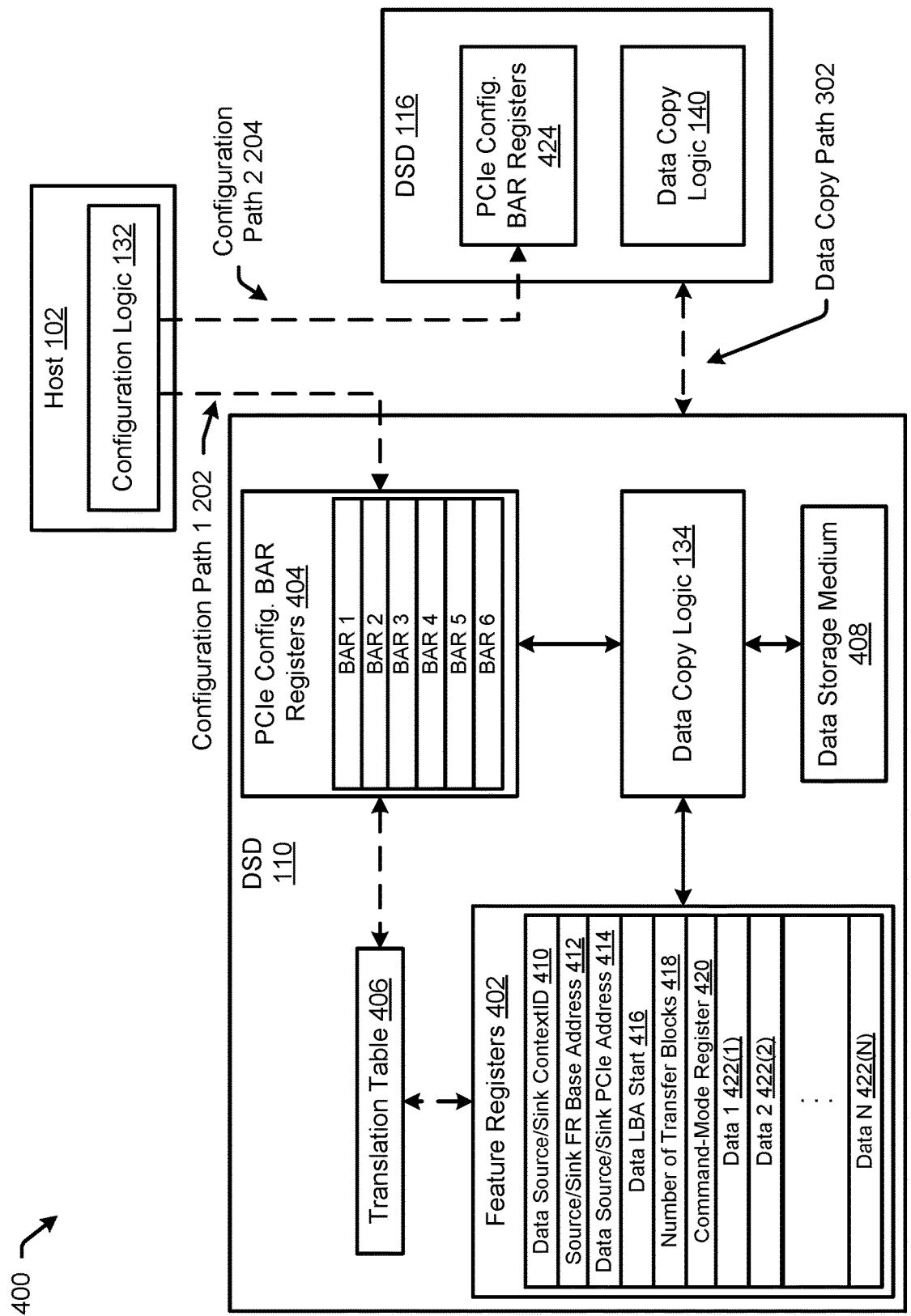
FIG. 4 is a block diagram of an example system including inter-device data transfer, in accordance with certain embodiments of the present disclosure.

FIG. 4 illustrates additional details of an example inter-device transfer according to FIGS. 1-3 in a particular example implementation using PCIe protocols. As illustrated, the DSD 110 may include feature registers 404, PCIe configuration base address registers (BARs) 404, a translation table 406, and a data storage medium 408 (e.g. a NAND subsystem) in addition to the data copy logic 132. The DSD 116 may also include feature registers (not shown), PCIe configuration base address registers 424, a translation table (not shown), and a data storage medium (not shown) in addition to the data copy logic 140.

In operation, the feature registers 402 may be exposed to the host device 102 through PCIe BARs 404. In some examples, half of the PCIe BARs may be used depending upon the design of the DSD (e.g. 32/64 bit access). After PCIe enumeration, DSDs may have appropriate address translation data such that access to the exposed PCIe BARs will translate via the translation table 406 as access to the feature registers of DSD, as per PCIe protocol. Though the illustrated example includes a single set of feature registers 402, some implementations may have multiple sets of features registers to support multiple concurrent streams of drive-to-drive transfers.

The DSDs may utilize the feature registers to implement the inter-drive data transfer. More particularly, the configuration logic 132 of the host device 102 may write to the feature registers during the configuration phase to configure the inter-drive data transfer. In some examples, the configuration logic 132 of the host device 102 may be an extension of host devices operating system driver, user space driver, or so on and may be implementation specific.

As shown, the example feature registers 402 may include registers for a data source/sink contextID 410, a source/sink FR base address 412, a data source/sink PCIe address 414, a data LBA start 416, a number of transfer blocks 418, a command-mode register 420 and N data registers 422(1)-422(N).

The contextID register 410 may be utilized as a source/sink selector and a data transfer identifier. For example, the register 410 may include a bit indicating if the DSD is to be a source or a sink for the data transfer and an identifier identifying the data transfer. In example implementations that may not include multiple concurrent streams, the identifier portion of this register may not be included.

The source/sink FR base address 412 may be an address for the feature registers of the other DSD (e.g. as configured by the host 102 for the other DSD BARs during PCIe enumeration). In the case of the source device, register 412 may be the feature register base address for the sink drive feature register. This may be utilized as the address to which the memory write and memory read TLPs may be addressed to when sending to the sink drive by the data copy logic of the source device. In the case of the sink device, register 412 may be the feature register base address for the source drive feature register. This may be utilized as the address to which the memory write and memory read TLPs may be addressed to when sending to the source drive by the data copy logic of the sink device. The base addresses may be unique within a given PCIe topology or network. The switches in the topology may direct that the TLPs towards the source/sink devices by routing TLPs to the intended source/sink devices using the base addresses.

The data source/sink PCIe address register 414 may be the PCIe Bus-Device-Function (BDF) id of other DSD of the transfer. In the case of the source device, register 414 may be the Bus:Device:Function number of sink DSD endpoint for matching purposes. In the case of the sink device, register 414 may be the Bus:Device:Function number of source DSD endpoint for matching purposes.

The data source/sink LBA register 416 may be utilized to store the LBA from which data is to be read and written to. In the case of the source device, register 416 may store the LBA from which data is to be read from the source device. In the case of the sink device, register 416 may store the LBA to which data is to be stored in the sink device. In some data transfers, register 416 configured to the same LBA for both the source device and sink device (e.g. a drive cloning transfer).

The number of transfer blocks register 418 may designate the number of blocks starting from the LBA start that may be transferred. In some example transfers, specifying '0' in the LBA start register of both devices and configuring register 418 to the number of blocks in the source drive will cause entire source device to be backed up at the sink device.

The command-mode register 420 may be used to trigger data transfers. In the case of the source device, a write to register 420 may start the inter-drive data transfer. For a sink device, register 420 may be written to cause the sink device to make ready for inter-drive transfer. In addition to triggering transfers, register 420 may be used to specify modes for the transfer. For example, register 420 may specify synchronous/asynchronous modes of copying. In this context, setting up a synchronous mode of operation may cause continuous backing up of blocks to the sink device whenever an included LBA of the source device is updated by the host device.

The data registers 422(1)-422(N) may correspond to the block data that the source is to transfer to the sink. In the case of the source device, registers 422 may be utilized as a place holder into which the sink data copy logic may write the data copy frames for processing by the source. In the case of the sink device, registers 422 may be utilized as a place holder into which the source data copy logic may write the data copy frames for processing by the sink. Data written to registers 422 of the sink may be written to the data storage medium 408 by the data copy logic of the sink.

While use of feature registers is described, the FRs described herein are merely examples of various embodiments. Different implementations may achieve similar results by skipping, adding, modifying, differently formatting one or more of the above mentioned FRs. The configuration logic of the host and data copy logic of both source and sink drives may need to be aware of the format and offset of the FRs that are utilized for the configuration and data copy phases, respectively.

Once the host device 102 has written to the feature registers, the data copy logic of the DSDs may affect the inter drive data transfer.

The data copy logic may implement a protocol to read data from the source device's data storage medium (e.g. non-volatile storage) and transfer the read data to the sink device in one or more fragments for writing into LBA of the sink device specified by host device. In some embodiments, the data copy logic may make use of existing logic of the DSD to read and write to the data storage medium and may vary depending on the implementation.

When configured as a data source, the data copy logic of the DSD may operate based on the configuration stored in the FRs to read block data from the data storage medium of the source device (e.g. from non-volatile memory or internal caches). The data copy logic of the source DSD may then send one or more MWr TLPs addressed to the data feature registers 422(1)-422(N) of the sink DSD. The one or more write requests encapsulated inside the MWr TLPs, apart from containing data to be written, may have header fields for the sender PCIe address, CommandID, Sink LBA, Data Length, Fragment ID, last fragment, and so on which may be used for copying the received data fragment into non-volatile memory at the specified LBA of the sink device.

When configured as a data sink, the data copy logic of the DSD may receive one or more write requests encapsulated inside the MWr TLPs addressed to the data feature registers 422(1)-422(N) of the sink DSD. Upon receiving the one or more write requests, the data copy logic of the sink DSD can ensure that the write requests have a BDF (e.g. a PCIe address) matching one that is configured in its data source address feature register and then may write the data into its non-volatile memory at the specified LBA of the sink device.

Upon successful copying of the data, the sink DSD may send an acknowledgement by writing to the data register 422 of the source DSD or to an ACK feature register of the source DSD (not shown). An acknowledgement may be written for each fragment or at end of complete transfer (last fragment header field=true).

As alluded to above, data copy frames may be exchanged between data copy logic of the source and sink DSDs. These frames can have fields like frame type, ContextID, SenderBDF, and frame type specific fields. The data copy frame type may have valid values such as data write, data write ack, failed operation, etc. The ContextID field may be a contextID programmed in the feature register. The SenderBDF field may be the PCIe address of the DSD that sent the data copy frame. As mentioned above, this field may be used to match against the value programmed by the host device in data source/sink PCIe address feature register. The frame type specific fields may be specific to the frame type. For example, when the frame type is "data write", the frame specific fields may include various field such as a data block number field, a last fragment field, a retry count field.

In summary, using the FR configuration data, the data copy logic of the DSDs may create data copy frames and direct the frames towards source/sink data feature registers 422 utilizing MWr/MRd PCIe TLPs. The address field of PCIe MWr/WRd TLP can be appropriately populated by source/sink data copy logic utilizing the data configured by the configuration logic 132 of the host device 102 into the source/sink FR base address register 412.

For data copy frames containing actual block data, the data copy logic of the source device may invoke the data storage medium subsystem 408 (e.g. a NAND subsystem) to read data from the data storage medium. The data read can be transferred by means of one or more MWr/MRd TLP(s) from the source to the sink with both source and sink data copy logic utilizing an appropriate protocol. The data copy logic of the sink device may invoke the data storage medium subsystem of the sink device (e.g. a NAND subsystem) to store the transferred data to the data storage medium.

While various examples of data copy logic are described herein, the logic discussed herein is merely an example embodiment. The header fields may be different but may have adequate information to allow the sink drive to write data into its non-volatile memory. Different implementations may implement different or more-complex protocols, different headers, security checks, and so on and achieve similar results.

Figure 5:
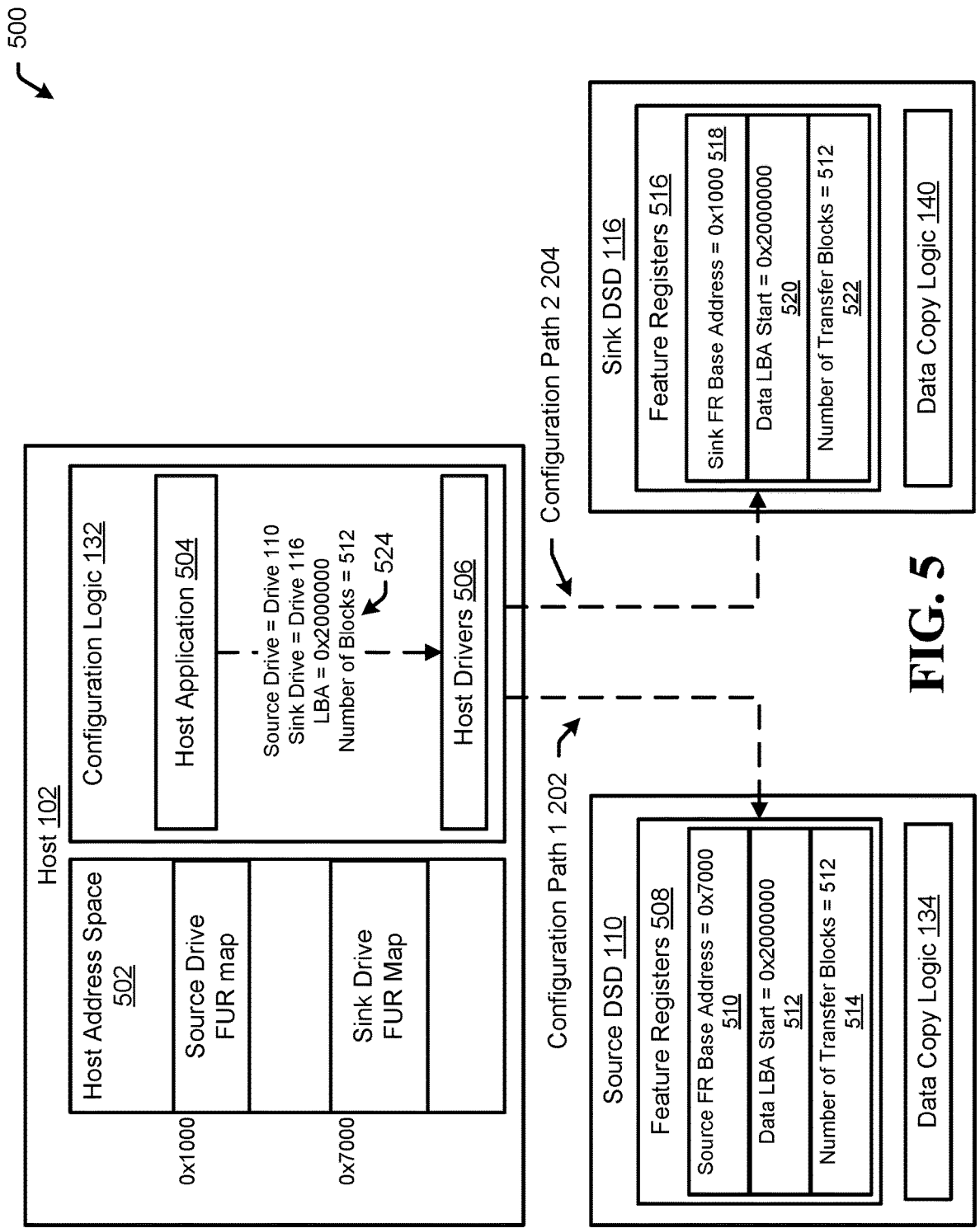
FIG. 5 is an block diagram of an example system performing an inter-device data transfer, in accordance with certain embodiments of the present disclosure.

FIG. 5 illustrates an example operation of the system illustrated in FIGS. 1-4 and discussed above. Specifically, the example 500 shows the host 102 configuring three of the feature registers of the DSD 110 and DSD 116 for triggering an inter-drive data transfer.

As shown, the host 102 may include a host address space 502 which may be a PCIe address space created during PCIe enumeration. Further, the configuration logic of the host 102 may include a host application 504 and host drivers 506.

In operation, the host application 504 may determine a transfer of data from DSD 110 to DSD 116 is to be configured. In particular, the data transfer may be a cloning transfer of 512 blocks from LBA 0x2000000 of the source DSD 110 to the same address of the sink DSD 116. The host drivers 506 may determine that the feature registers of the source DSD 110 are mapped to the address 0x1000 and the feature registers of the sink DSD 116 are mapped to the address 0x7000. Using this information, the host driver 506 may write to the FRs 508 of the source DSD 110 and the FRs 516 of the sink DSD 116. Specifically, the host driver 506 may write "0x7000" to the source FR base address register 510, 0x2000000 to the source Data LBA start register 512, and 512 to the source number of transfer blocks register 514. The host driver 506 may further write "0x1000" to the sink F base address register 518, 0x2000000 to the sink data LBA start register 520, and 512 to the sink number of transfer blocks register 522.

Based on this configuration, the data copy logic 134 and 140 may perform the configured data transfer without active participation of the host device.

Figure 6:
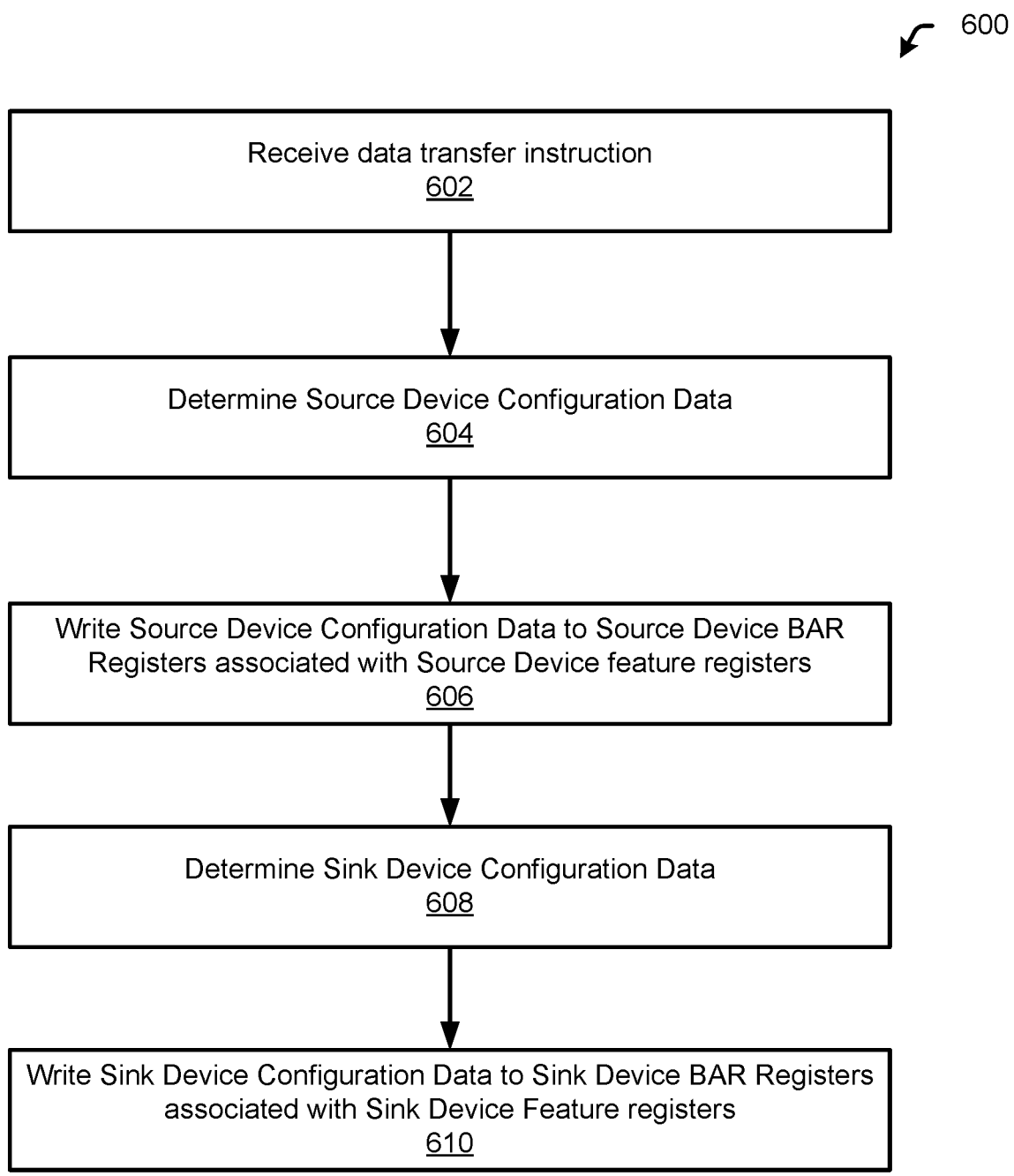
FIG. 6 is a flowchart of a method of inter-device data transfer, in accordance with certain embodiments of the present disclosure.

Referring to FIG. 6, a flowchart of a method of inter-device data transfer is shown and generally designated 600, in accordance with certain embodiments of the present disclosure. Specifically, FIG. 6 provides an example method of the configuration logic of a host device 102 that may configure an inter-device data transfer between two data storage devices.

At 602, the configuration logic of a host device may receive an instruction to configure a data transfer. At 604, the configuration logic of the host device may determine source device configuration data to be written to the source device feature registers. The source device configuration data may be in accordance with the examples discussed above. At 606, the configuration logic of the host device may then write the source device configuration data to the source device BAR registers associated with the feature registers of the source device. As discussed above, the source device configuration data may include a command field or register which may trigger the source device to perform the configured data transfer without active participation by the host device.

Further, at 608, the configuration logic of the host device 102 may determine sink device configuration data to be written to the sink device feature registers. The sink device configuration data may be in accordance with the examples discussed above. At 610, the configuration logic of the host device may then write the sink device configuration data to the sink device BAR registers associated with the feature registers of the sink device. As discussed above, the sink device configuration data may include a command field or register which may trigger the sink device to prepare to receive the configured data transfer and to store the received data to a data storage medium of the sink device.

Figure 7:
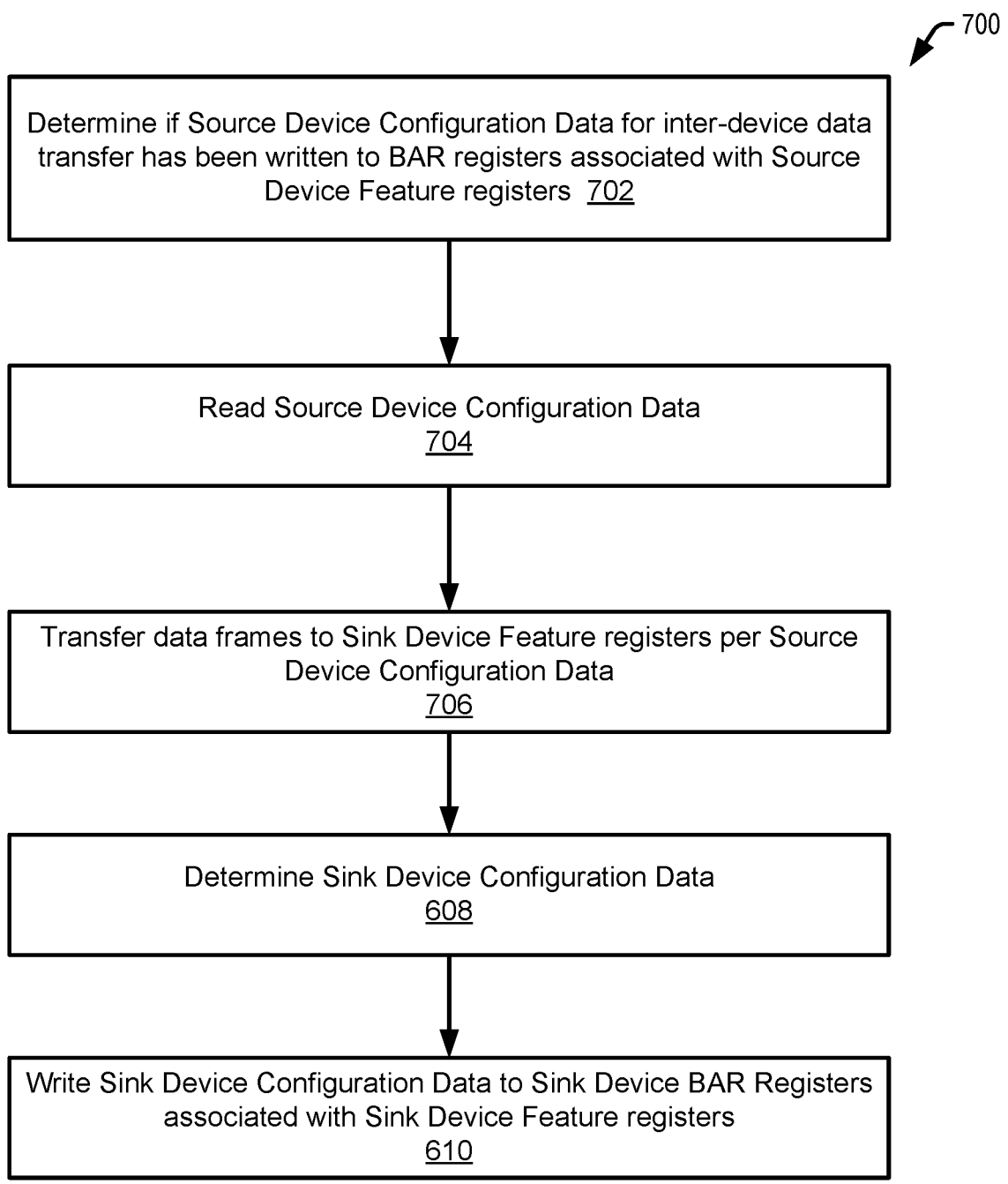
FIG. 7 is a flowchart of a method of inter-device data transfer, in accordance with certain embodiments of the present disclosure.

Referring to FIG. 7, a flowchart of a method of inter-device data transfer is shown and generally designated 700, in accordance with certain embodiments of the present disclosure. Specifically, FIG. 7 provides an example method of the data copy logic of a source device that may perform an inter-device data transfer to a sink device without active participation by a host device that configured the transfer.

At 702, the data copy logic of the source device may determine source device configuration data for an inter-drive data transfer has been written to the BAR registers associated with feature registers of the source device. In some examples, the data copy logic may monitor the command register of the feature registers of the source device to determine if the command register contains a value triggering an inter-device data transfer.

At 704, in response to the trigger value in of the command register, the data copy logic of the source device may read the source device configuration data and prepare the inter-device data transfer. Then, at 706, the data copy logic of the source device may transfer data frames to sink drive feature registers in accordance with the source drive configuration data. As mentioned above, the inter-device data transfer may be performed using PCIe TLPs or similar operations such that the host device may not need to actively participate.

Figure 8:
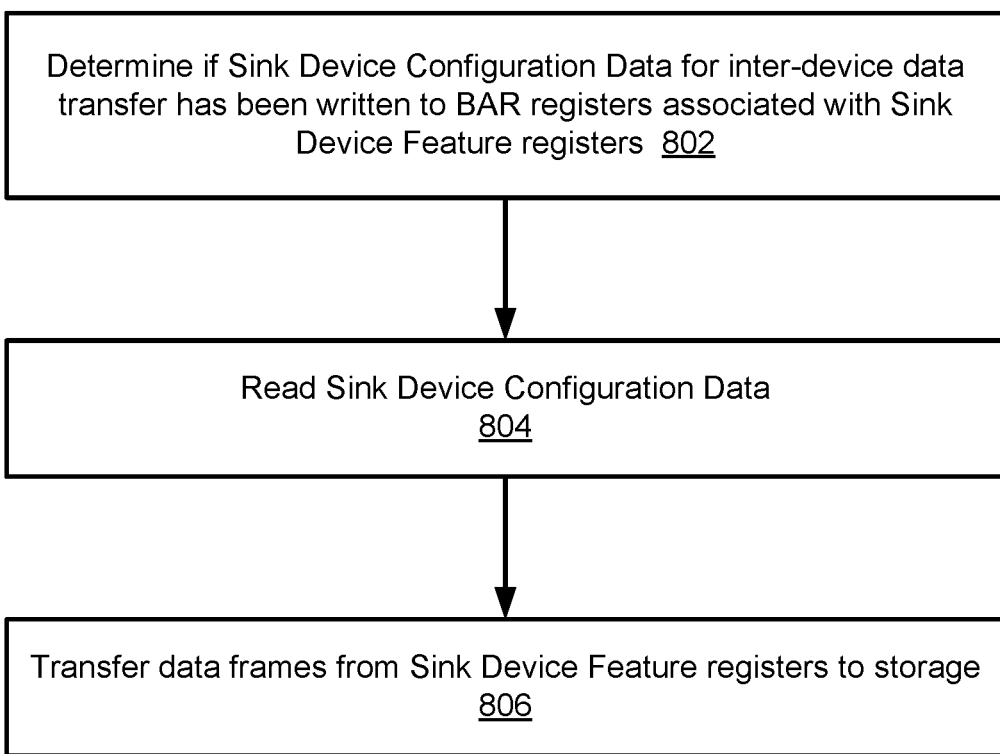
FIG. 8 is a flowchart of a method of inter-device data transfer, in accordance with certain embodiments of the present disclosure.

Referring to FIG. 8, a flowchart of a method of inter-device data transfer is shown and generally designated 800, in accordance with certain embodiments of the present disclosure. Specifically, FIG. 8 provides an example method of the data copy logic of a sink device that may perform an inter-device data transfer to receive data from a source device without active participation by a host device that configured the transfer.

At 802, the data copy logic of the sink device may determine sink device configuration data for an inter-drive data transfer has been written to the BAR registers associated with feature registers of the sink device. In some examples, the data copy logic may monitor the command register of the feature registers of the sink device to determine if the command register contains a value triggering an inter-device data transfer.

At 804, in response to the trigger value in of the command register, the data copy logic of the sink device may read the sink device configuration data and prepare to receive and process data transferred as part of the inter-device data transfer. Then, at 806, the data copy logic of the sink device may process the received data frames in the sink device feature registers and transfer the received data from the sink device feature registers to the storage medium of the sink device. As mentioned above, the inter-device data transfer may be performed using PCIe TLPs or similar operations such that the host device may not need to actively participate. Though not shown, in some implementations, an acknowledgement may be sent to notify the host that a data transfer operation configured by the host is completed.

Components and circuits used to perform the operations in the methods above may be discrete, integrated into a system on chip (SOC), or other circuits. Further, the steps can be carried out in a processor (e.g. a digital signal processor), implemented in software, implemented via firmware, or by other means.

Figure 9:
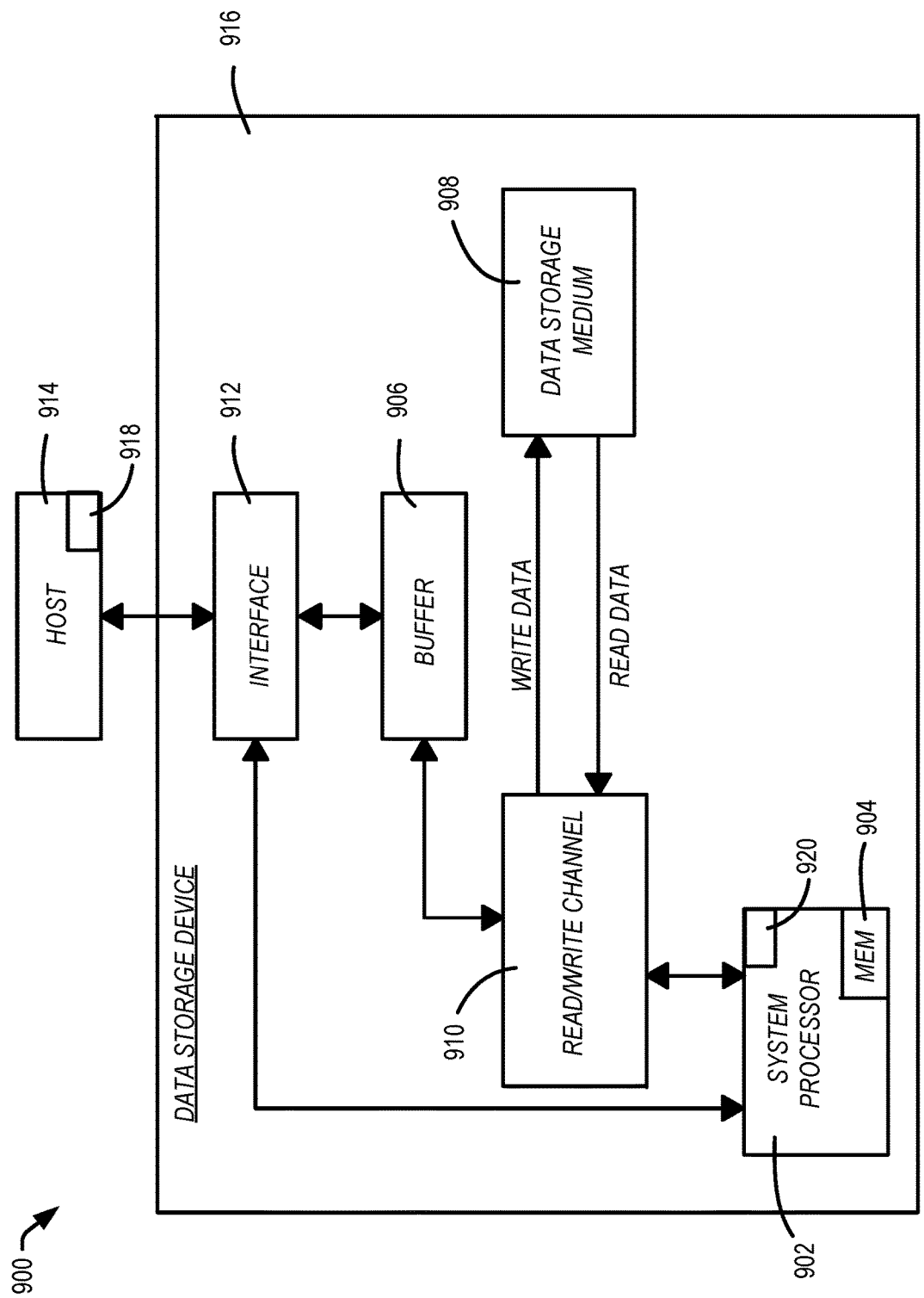
FIG. 9 is a block diagram of a system including inter-drive transfers, in accordance with certain embodiments of the present disclosure.

Referring to FIG. 9, a block diagram of a data storage system including inter-device data transfer is shown and generally designated 900. The system 900 can be an example of a data storage device (DSD), and may be an example implementation of systems 100-800. The DSD 916 can optionally connect to and be removable from a host device 914, which can be a device or system having stored data, such as a desktop computer, a laptop computer, a server, a digital video recorder, a photocopier, a telephone, a music player, other electronic devices or systems not listed, or any combination thereof. The data storage device 916 can communicate with the host device 914 via the hardware/firmware based host interface circuit 912 that may include a connector (not shown) that allows the DSD 916 to be physically connected and disconnected from the host 914 (e.g. via a PCIe network).

The DSD 916 can include a system processor 902, which may be a programmable controller, and associated memory 904. The system processor 902 may be part of a system on chip (SOC). A buffer 906 may temporarily store data during read and write operations and can include a command queue. The read/write (R/W) channel 910 can encode data during write operations to, and reconstruct data during read operations from, the data storage medium 908. The data storage medium 908 is shown and described as a hard disc drive, but may be other types of medium, such as a flash medium, optical medium, or other medium, or any combination thereof.

The R/W channel 910 may receive data from more than one data storage medium at a time, and in some embodiments can also receive multiple data signals concurrently, such as from more than one output of a read head. For example, storage systems having two-dimensional magnetic recording (TDMR) systems can have multiple reading or recording elements, and can read from two tracks simultaneously or nearly simultaneously. Multi-dimensional recording (MDR) systems can receive two or more inputs from multiple sources (e.g. recording heads, flash memory, optical memory, and so forth). The R/W channel 910 can combine multiple inputs and provide a single output.

The blocks 918 and 920 can implement all of or part of the systems and functionality of systems and methods 100-800. In some embodiments, block 918 may be a separate circuit, integrated into the host device, included in a system on chip, firmware, software, or any combination thereof. Similarly, the block 920 may be a separate circuit, integrated into the processor of the storage device, included in a system on chip, firmware, software, or any combination thereof.

Many variations would be apparent in view of this disclosure. For example, in some implementations, the feature registers may not be exposed to the host device through PCIe BAR registers but may be accessible in-band by the host by means of vendor specific commands allowed by the utilized protocol. Further, many of the feature registers discussed herein may not be included in all implementations. In another variation, the FR configuration may be done by a baseboard management controller (BMC) or any other entity on the PCIe topology capable of accessing the FR of the DSDs. The FR may be accessed in-band through the PCIe bus or out-of-band. Moreover, the FR of a PCIe drive (namespace) may be exposed to an upstream host by means of a separate PCIe device function's BAR on the drive (endpoint) instead of a BAR of the actual drive function. In some implementations, source-sink data copy logic may operate using MRd TLPs. Also, the examples discussed above include inter-drive data transfers using MWr/MRd TLPs. Some implementations may use other addressing modes available under the PCIe protocol.

In still another variation, object storage based systems may provide an object identification FR in lieu of a Data LBA start FR to indicate the locations of the non-volatile media to be replicated from source to sink drives.

In other variations, a ReRAM type linear addressing storage system may provide a Start Memory Location FR in leiu of a data LBA start FR to indicate the locations of the non-volatile media to be replicated from source to sink drives.

While the above description includes some embodiments that describe data storage device implementations, the present disclosure can be applied to any system that needs to transfer data between storage devices. For example, the present disclosure can be utilized in a host computer with multiple data storage devices or in a data center rack.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A system comprising:
a first data storage device including:
a data storage medium;
one or more feature registers configured to be communicatively exposed to a host device; and
a controller configured to:
determine that first configuration data has been written to the one or more feature registers, the first configuration data configured to cause the first data storage device to perform an inter-drive data transfer of identified data to a second data storage device without copying the identified data into a host memory of the host device;
retrieve the identified data from the data storage medium based on the first configuration data; and
perform the inter-drive data transfer of the identified data to the second data storage device without copying the identified data into the host memory.

2. The system of claim 1, further comprising:
the controller further configured to:
determine that second configuration data has been written to the one or more feature registers, the second configuration data configured to cause the first data storage device to receive a second inter-drive data transfer of data without the received data being copied into the host memory; and
store the received data to the data storage medium based on the second configuration data.

3. The system of claim 1, further comprising:
the controller further configured to:
communicate with the host device and the second data storage device using a Peripheral Component Interconnect Express (PCIe) protocol; and
perform the inter-drive data transfer using PCIe Transaction layer packets.

4. The system of claim 3, further comprising the first data storage device being connected to the host device and the second data storage device via at least one PCIe switch and a plurality of PCIe interconnects.

5. The system of claim 1, further comprising:
the host device including:
the host memory; and
a host processor configured to:
receive a request to transfer data from the first data storage device to the second data storage device;
generate the first configuration data; and
write the first configuration data to one or more feature registers of the first data storage device to cause the first data storage device to perform the requested data transfer.

6. The system of claim 1, further comprising the first configuration data including one or more fields configured to cause the first data storage device to perform the inter-drive data transfer of the identified data continuously such that, when a data block included in the identified data is updated by the host device, the controller sends a copy of the updated data block to the second data storage device.

7. An apparatus comprising:
a first data storage device including:
a data storage controller configured to:
determine that first configuration data has been written to one or more feature registers, the first configuration data configured to cause the first data storage device to receive an inter-drive data transfer of data from a second data storage device without the data being copied into a host memory of a host device;
receive the inter-drive data transfer of the data from the second data storage device at the one or more feature registers; and
store the data from the one or more feature registers to a data storage medium within the first data storage device based on the first configuration data.

8. The apparatus of claim 7, further comprising:
the data storage controller configured to:
determine that second configuration data has been written to the one or more feature registers, the second configuration data configured to cause the device to perform a second inter-drive data transfer of second data to the second data storage device without copying the second data into the host memory of the host device;
retrieve the second data from the data storage medium based on the second configuration data; and
perform the second inter-drive data transfer of the second data to the second data storage device without copying the second data into the host memory.

9. The apparatus of claim 7, further comprising:
the data storage controller configured to:
communicate with the host device via a Peripheral Component Interconnect Express (PCIe) protocol; and
receive the inter-drive data transfer as PCIe Transaction layer packets.

10. The apparatus of claim 7, further comprising:
the apparatus including the host device;
the host device including:
the host memory; and a host processor configured to:
receive a request to transfer data from the first data storage device to the second storage device;
generate first configuration data; and
write the first configuration data to the one or more feature registers of the first data storage device to cause the first data storage device to perform the requested data transfer.

11. The apparatus of claim 7, further comprising:
the first data storage device further including:
the data storage medium;
the one or more feature registers; and
a Peripheral Component Interconnect Express (PCIe) interface including first configuration base address registers, a first translation table, and first feature registers, with the first feature registers communicatively exposed to the host device through the first configuration base address registers.

12. The apparatus of claim 7, further comprising the one or more feature registers include registers for (1) indicating the first data storage device as a sending device or receiving device, (2) indicating a base address, (3) indicating a logical block address (LBA) start indicator, (4) indicating a number of transfer blocks, (5) initiating a data transfer, and (6) storing data to be transferred.

13. A method comprising:
determining, via a first data storage device configured to be communicatively coupled to a host computing device, first configuration data has been written to one or more feature registers of the first data storage device, the first configuration data configured to cause the first data storage device to perform a first inter-drive data transfer of identified data to a second data storage device without copying the identified data into a host memory of the host computing device;
retrieving the identified data from a first data storage medium of the first data storage device based on the first configuration data; and
performing the inter-drive data transfer of the identified data to the second data storage device without copying the identified data into the host memory.

14. The method of claim 13, further comprising continuously transferring data to the second storage device whenever a logical block address (LBA) of the first data storage device is updated by the host device, such that the first data storage device sends a copy of data corresponding to the LBA to the second storage device via the inter-drive data transfer.

15. The method of claim 13, further comprising:
communicating with the host device and the second data storage device using a Peripheral Component Interconnect Express (PCIe) protocol; and
performing the inter-drive data transfer using PCIe Transaction layer packets.

16. The method of claim 15, further comprising receiving, at the data storage device, an assignment of memory address space from the host device via a PCIe enumeration process, such that access to base address registers of the data storage device will translate via a translation table as access to corresponding feature registers.

17. The method of claim 16, further comprising the feature registers of the first data storage device include feature registers for identification of the data storage device as an inter-drive data transfer sending device or receiving device, a base address, a logical block address (LBA) start indicator, a number of transfer blocks, a command-mode register to trigger a data transfer, and multiple data registers.

18. The method of claim 13, further comprising, based on the first configuration data including one or more fields configured to cause the first data storage device to perform an inter-drive data transfer of identified data when a data block included in the identified data is updated by a host device, sending a copy of the updated data block to the second data storage device.

19. The method of claim 13, further comprising transferring the data to the second data storage device in multiple fragments via the inter-drive data transfer.

20. The method of claim 13, further comprising determining an acknowledgement that at least part of the inter-drive data transfer has completed by reading to a register of the first data storage device that the second data storage device has written upon successful copying of data corresponding to the acknowledgment.

* * * * *